(12) United States Patent
Soe

(10) Patent No.: US 12,151,977 B2
(45) Date of Patent: Nov. 26, 2024

(54) MAGNESIUM OXYCHLORIDE CEMENT (MOC) AND A METHOD OF MANUFACTURING

(71) Applicant: UBIQ Technology Pty Ltd, Gladesville (AU)

(72) Inventor: Khin Thandar Soe, Gladesville (AU)

(73) Assignee: UBIQ TECHNOLOGY PTY LTD, Gladesville (AU)

( * ) Notice: Subject to any disclaimer, the term of this patent is extended or adjusted under 35 U.S.C. 154(b) by 386 days.

(21) Appl. No.: 17/291,974

(22) PCT Filed: Nov. 15, 2019

(86) PCT No.: PCT/AU2019/051257
§ 371 (c)(1),
(2) Date: May 6, 2021

(87) PCT Pub. No.: WO2020/093111
PCT Pub. Date: May 14, 2020

(65) Prior Publication Data
US 2021/0403381 A1    Dec. 30, 2021

(30) Foreign Application Priority Data

Nov. 6, 2018 (CN) .......................... 201811317027.8
Nov. 15, 2018 (AU) ................................ 2018904359

(51) Int. Cl.
| | | |
|---|---|---|
| C04B 14/44 | (2006.01) |
| C04B 14/18 | (2006.01) |
| C04B 14/20 | (2006.01) |
| C04B 18/08 | (2006.01) |
| C04B 18/14 | (2006.01) |
| C04B 18/24 | (2006.01) |
| C04B 24/42 | (2006.01) |
| C04B 28/32 | (2006.01) |
| C04B 40/00 | (2006.01) |
| C04B 14/42 | (2006.01) |
| C04B 18/06 | (2006.01) |
| C04B 22/16 | (2006.01) |
| C04B 103/60 | (2006.01) |
| C04B 103/61 | (2006.01) |
| C04B 111/26 | (2006.01) |
| C04B 111/27 | (2006.01) |

(52) U.S. Cl.
CPC ............ *C04B 28/32* (2013.01); *C04B 14/185* (2013.01); *C04B 14/206* (2013.01); *C04B 14/44* (2013.01); *C04B 18/08* (2013.01); *C04B 18/141* (2013.01); *C04B 18/146* (2013.01); *C04B 18/248* (2013.01); *C04B 24/42* (2013.01); *C04B 40/0028* (2013.01); *C04B 14/42* (2013.01); *C04B 18/067* (2013.01); *C04B 18/24* (2013.01); *C04B 22/165* (2013.01); *C04B 2103/60* (2013.01); *C04B 2103/61* (2013.01); *C04B 2111/26* (2013.01); *C04B 2111/27* (2013.01)

(58) Field of Classification Search
CPC ..... C04B 28/32; C04B 14/185; C04B 14/206; C04B 14/44; C04B 18/08; C04B 18/141; C04B 18/146; C04B 18/248; C04B 24/42; C04B 40/0028; C04B 14/42; C04B 18/067; C04B 18/24; C04B 22/165; C04B 2103/60; C04B 2103/61; C04B 2111/26; C04B 2111/27; C04B 2111/60; C04B 18/14; C04B 18/18; C04B 40/00; C04B 28/30; C04B 24/40; C04B 14/18; C04B 14/20; C04B 14/202
See application file for complete search history.

(56) References Cited

U.S. PATENT DOCUMENTS

| | | | | |
|---|---|---|---|---|
| 4,174,228 A | * | 11/1979 | Boberski ................. | C04B 24/42 106/18.21 |
| 4,631,273 A | * | 12/1986 | Blehm .................... | C09K 23/54 514/939 |
| 5,004,505 A | * | 4/1991 | Alley ....................... | C04B 9/02 106/688 |
| 5,209,775 A | | 5/1993 | Bank et al. | |
| 5,421,866 A | | 6/1995 | Stark-Kasley et al. | |
| 7,658,795 B2 | * | 2/2010 | Caine ....................... | C04B 9/02 106/688 |
| 2011/0088597 A1 | * | 4/2011 | Wu .......................... | C04B 28/32 106/688 |
| 2013/0263759 A1 | * | 10/2013 | Rademan ................ | C04B 28/32 106/661 |
| 2015/0203408 A1 | | 7/2015 | Sroka et al. | |
| 2016/0340254 A1 | * | 11/2016 | Edgar ...................... | E04B 5/32 |

FOREIGN PATENT DOCUMENTS

| | | | | |
|---|---|---|---|---|
| CN | 106800384 A | * | 6/2017 | ............. C04B 28/32 |
| WO | 2008004242 A2 | | 1/2008 | |

OTHER PUBLICATIONS

M. Dawood, 2014, pp. 96-114. [retrieved from internet at Mar. 27, 2023 from <URL https://www.sciencedirect.com/topics/engineering/organosilane#:~:text=Organosilanes%20are%20monomeric%20silicone%2Dbased,(de%20Buyl%2C%20n.d.).>] (Year: 2014).*
CN-106800384-A, machine translation (Year: 2017).*
Sam A. Walling and John L. Provis. Magnesia-Based Cements: A Journey of 150 Years, and Cements for the Future? Chemical Reviews 2016 116 (7), 4170-4204, DOI: 10.1021/acs.chemrev. 5b00463 (Year: 2016).*
International Search Report and Written Opinion dated Jan. 31, 2020 in International Application No. PCT/AU2019/051257, 11 pages.

* cited by examiner

*Primary Examiner* — Anthony J Green
*Assistant Examiner* — Marites A Guino-O Uzzle
(74) *Attorney, Agent, or Firm* — Berg Hill Greenleaf Ruscitti LLP

(57) ABSTRACT

A magnesium oxychloride cement (MOC) incorporating an emulsion of active cationic organo-silane and method of making same.

21 Claims, 13 Drawing Sheets

MAGNESIUM OXYCHLORIDE CEMENT (MOC) AND A METHOD OF MANUFACTURING

CROSS REFERENCE TO RELATED APPLICATION

This application is a national stage application under 35 U.S.C. 371 of PCT Application No. PCT/AU2018/051257 having an international filing date of Nov. 15, 2019, which designated the United States, which PCT application claimed the benefit of Chinese Application Serial No. 201811317027, filed Nov. 6, 2018 and of Australian Application Serial No. 2018904359, filed Nov. 15, 2018, all of which are incorporated by reference in their entirety. #

TECHNICAL FIELD

The invention relates to the field of manufacture of building materials. In particular, the invention relates to an improved magnesium oxychloride cement (MOC), a method of making same, a method of producing an article from same and articles made from same.

BACKGROUND OF THE INVENTION

Magnesium oxychloride hydroxide cement (MOC) (also known as magnesia cement or Sorel cement) is a non-hydraulic cement that was first produced by Stanislaus Sorel in 1867. Since then, it has found application in the construction industry. It is comprised of light burnt magnesia (MgO) and aqueous magnesium chloride ($MgCl_2$) solution with the proportion by weight of 2.5:1 to 3.5:1 of MgO to $MgCl_2$ solution.

MOC exhibits superior performance, regarding high strength, fire resistance and acoustic performance, compared with Portland cement products. However, the applications of non-hydraulic magnesium oxychloride hydroxide cement (MOC) has been limited in the construction industry because MOC exhibits a lack of water resistance due to its hydrophilic behaviour and to its 'breathable characteristics' arising from its porous structure. MOC tends to gradually sequester carbon dioxide throughout its life when placed in a moisture rich environment.

Moisture breaks the chain-link structure of the magnesium cement phase and results in the production of magnesium hydroxide (Brucite) and free chloride ions ($Cl^-$). Brucite reacts with carbon dioxide in the air and the free chloride ions react with metals leading to steel corrosion. Moreover, moisture causes the magnesium chloride to deliquesce on conventional MOC products, generating an electrolyte that causes corrosion of any steel in contact with MOC. This is also one of the critical issues of degradation of conventional MOC over the long-term.

Several modifications have been made to improve water resistance of MOC by using modifiers such as stearates, acetates and acids like phosphoric acid in the composition, or applying water repellent agents on the finished product. Until now the most effective modifier for water resistance for MOC are phosphates.

However, carbon sequestration still remains an issue and there has to date been no satisfactory way to prevent carbon sequestration in the MOC in a moisture rich environment. The prior art suggests only accelerating carbonation during the curing process for achieving early-life strength instead of prevention of degradation for the long-term.

During the hydration process of MOC, different phases of needle like crystal structures are formed. The desired crystal formations are phase 5 (equation 1 below) and phase 3 (equation 2 below) which are stable at room temperature, whereas the others, phase 2 ($2Mg(OH)_2 \cdot MgCl_2 \cdot 4H_2O$) and phase 9 ($9Mg(OH)_2 \cdot MgCl_2 \cdot 5H_2O$), revert to magnesium hydroxide because these crystal structures are not stable at temperatures under 100° C. Therefore, phase 5 and phase 3 provide the best strength for MOC at room temperature.

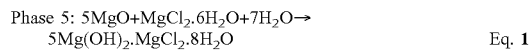

Phase 5: $5MgO + MgCl_2 \cdot 6H_2O + 7H_2O \rightarrow 5Mg(OH)_2 \cdot MgCl_2 \cdot 8H_2O$  Eq. 1

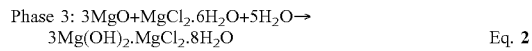

Phase 3: $3MgO + MgCl_2 \cdot 6H_2O + 5H_2O \rightarrow 3Mg(OH)_2 \cdot MgCl_2 \cdot 8H_2O$  Eq. 2

Due to its hydrophilic behaviour, the MOC absorbs the moisture though the pore and capillary structure of the matrix. Although phase 5 has superior mechanical properties among all other phases, it is transformed into phase 3 in prolonged contact with water at room temperature. As a result, Brucite ($Mg(OH)_2$) is produced.

Brucite reacts with $CO_2$ from the air and a surface layer of magnesium chlorocarbonate (Magnesite)—($Mg(OH)_2 \cdot 2MgCO_3 \cdot MgCl_2 \cdot 6H_2O$)—also known as efflorescence—is formed. This is called carbon sequestration of MOC (Equation 3 below). Enhancing carbonation during the hydration process provides an improvement in the strength of the material. However, carbon sequestration is one of the main reasons for MOC degradation in the long-term.

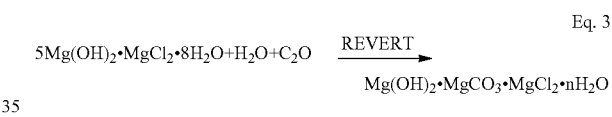

Eq. 3

$5Mg(OH)_2 \cdot MgCl_2 \cdot 8H_2O + H_2O + C_2O \xrightarrow{REVERT} Mg(OH)_2 \cdot MgCO_3 \cdot MgCl_2 \cdot nH_2O$ Moreover, moisture ingress into the MOC matrix tends to cause leaching of magnesium chloride salt by releasing higher concentrations of brucite and free chloride ions. According to the adsorption theory, the moisture ingress into the MOC matrix causes chloride ions to adsorb on the absorbent surface by forming an electrolyte film layer. If the absorbent is a metal, such as steel, chloride ions favour the diffusion to the metal and destroy the passive oxide layer, thereby leading to corrosion of the metal.

It has been reported that both types of conventional Sorel cements—magnesium oxychloride cement and magnesium oxysulphides cement—exhibit the corrosion problem in contact with steel.

It is an object of the present invention to provide a more durable MOC in relation to water resistance, carbon sequestration and corrosion resistance.

SUMMARY OF THE INVENTION

This invention provides a new Silane Modified Magnesium Oxychloride Cement (SMMOC) which aims to prevent MOC from experiencing carbon sequestration, leading to an improvement in water resistance, corrosion resistance and carbon sequestration resistance of MOC.

It has been found by the inventors that the chemical reaction in the presence of moisture is also activated at the interface between the fibreglass mesh reinforcement and the MOC matrix. This leads gradual destruction of the bond and long-term reduction in the strength of the MOC matrix.

In addition, investigation by the inventor has shown that thin MOC panels experience cupping and bowing distortion due to the exothermic heat of hydration. One of the objectives of this invention is to control the distortion of thin panel during hydration process and throughout the service life of the product.

The invention aims to provide a non-degrading cement matrix with a relatively long effective life due to the reduction of carbon sequestration and moisture in a high moisture environment and prevention of bond failure to the fibreglass reinforcement. As a consequence, other qualities of MOC, such as fire resistance, corrosion resistance, strength, water absorption, etc., are typically improved.

The inventor has learnt that a composition with a stoichiometrically accurate ratio of MgO and a higher proportion of water to $MgCl_2$ provides higher water resistance. These approaches have achieved certain degree of success but by themselves not solve all the problems relating to moisture.

The present invention involves the prevention of ionic exchange of the MOC molecules from occurring in consecutive reactions after sorption of moisture from a humid environment, so that it minimises the degradation of MOC over its service life. For this purpose, a new cement composition, Silane Modified Magnesium Oxychloride Cement (SMMOC) can be used for a wide variety of building and construction products with significant improvement in durability, structural performance, dimensional stability, light weight, fire resistance, water resistance and reduced carbon sequestration during its service life.

A combination of light burnt magnesia and magnesium chloride aqueous solution is the main binder of conventional Sorel Cement. In the present invention, cementitious materials are used as the additional binder to enhance the cementitious properties of the cement. Particles sizes of the additional cementitious materials are selected under 45 microns to achieve better microstructural formation in the composition.

Further according to the invention, the molar ratios of $MgO/MgCl_2$, the quantity of other solid materials and the quantity of active silane are carefully calculated in order to enhance the protection of the SMMOC matrix from moisture ingress. Based on the literature and data from experiments prior to this invention, a calculated amount of phosphoric acid is used in the SMMOC composition for reducing water solubility so that water resistance is improved compared with prior art MOC.

The light-weight aggregate preferably used in the present invention is expanded perlite having a water absorption range and particle size that are specified herein. The expanded perlite provides improved fire resistance and weight control of the SMMOC.

In this invention, organic fibre, such as rice husk, may preferably be used to enhance the bridging strength of the SMMOC. It may also serve as a lightweight filler for the SMMOC. Exfoliated vermiculite, preferably having specific particle size and water absorption, may also be preferably used in combination with rice husk to enhance fire resistance and to reduce the specific mass of the cement.

The water absorption capacity of expanded perlite and exfoliated vermiculite is relatively high due to their porous nature. This can impact on the flowability of SMMOC paste by reducing water in the composition. Hence, the consistency of water absorption rate of expanded perlite and exfoliated vermiculite are preferably specified very carefully for achieving controllable composition. Moreover, this is also important to provide predictable workability and adhesion between different layers of pastes when the SMMOC are produced in the form of 'sandwich' layers.

According to a further aspect of the invention, there is provided a method of calculation for the required quantity of silane for the SMMOC is provided in order to achieve the most effective hydrophobicity in the SMMOC matrix.

According to a further aspect of the invention, there is provided a replacement of $MgCl_2$ with $MgSO_4$ (magnesium sulphate) in the manufacturing the silane modified magnesium oxysulfate cement (SMMOSC).

According to a further aspect of the invention, there is provided a method of manufacturing SMMOC cement.

According to a further aspect of the invention, there is provided a method of manufacturing building products from SMMOC.

According to a further aspect of the invention there are provided profiles of SMMOC building products.

According to a further aspect of this invention, there is provided a method of manufacturing silane-modified magnesium oxysulfate cement and silane-modified magnesium oxysulfate cement (SMMOC/SMMOSC) building products with polyvinyl alcohol (PVA) fibres.

Now will be described, by way of specific, non-limiting examples, preferred embodiments of the invention with reference to the drawings.

DETAILED DESCRIPTION OF THE INVENTION

Figure 1A:
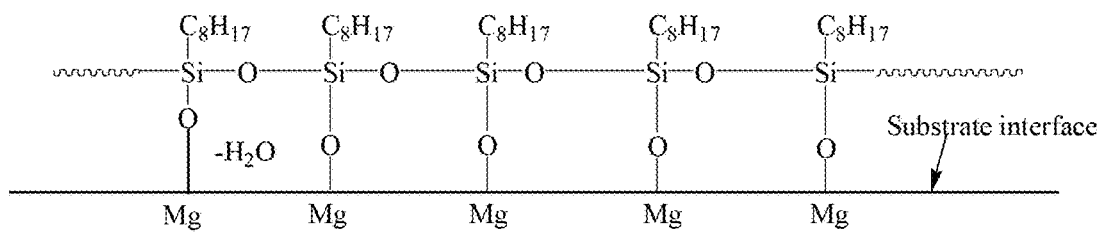
FIG. 1 shows formation of Si—O—Mg bonds with $C_8H_{17}$ in the SMMOC matrix.

The invention aims to enable high performance MOC cement products which have advantages over those currently utilised in the construction industry.

The novel invention is a new silane-modified magnesium oxide cement (SMMOC) cement composition, in which the magnesium oxychloride hydroxide cement molecular structure is effectively protected from solubility in water. It has been developed by addition of active cationic organo-silane into the MOC mixture. As a result, the water solubility of MOC decreases by minimising the opportunity for reaction between water and MOC molecules. Water resistance and corrosion resistance are thereby improved. Carbon sequestration is also minimised so that degradation of the SMMOC is mitigated in the long-term. For this purpose, the quantities of ingredients and the hydrophobic agent are carefully calculated in making the wet paste composition to produce the most effective finished SMMOC.

The inventor has learnt that excessive magnesium oxide leads to production of higher levels of brucite in the presence of water, and less magnesium oxide may release more free chloride ions in the composition.

As a result, the MOC cements may exhibit a higher risk of: leaching the magnesium chloride; efflorescence; dimensional instability; corrosion; and carbon sequestration. In addition, excessive $MgCl_2$ in MOC may cause moisture absorption so that the MOC expands slightly, leading to $MgCl_2$ salt efflorescence and leaching.

In this invention, the composition comprises the optimal weight ratio and molar ratio of light burnt Magnesia to Magnesium Chloride Hexahydrate, $MgO/MgCl_2$. Preferably the weight ratio of $MgO/MgCl_2$ is within the range 1.5 to 2.2.

In terms of molar ratio, the optimal range of $MgO/MgCl_2$ molar ratio is usually selected within the range 8 to 11. The higher molar ratio of $MgO/MgCl_2$ tends to produce more structural crystal formation and formation of a MgO 'blanket' that protects phase 5 crystals from aqueous media.

However, the inventor has determined that a higher molar ratio of $MgO/MgCl_2$ tends to generate excessive MgO and the excessive water causes the segregation and bleeding of MOC. The preferred water/cement ratio used in this invention is within 0.4 to 0.6, i.e., the molar ratio of $H_2O/MgCl_2$ is 19 to 21. This also helps to achieve the right workability of the composition in production by using an automated production system.

In the present invention, the composition includes a hydrophobic agent, preferably active cationic organo-silane. The method of calculation of the required quantity of silane based on the active content proportion in the aqueous solution to protect the interface of magnesium cement (SMMOC) provides a further aspect of the invention.

The cationic organo-silane is a light blue emulsion with 40% to 50% by mass of Si particles that have a size of less than 20 nm, in the active silane percentile of the emulsion, and approximately 1% of emulsifier. In comparison with colloidal silicon, silane has greater electronegativity of hydrogen and hence Si—H bond polarity is the opposite of C—H bond polarity. Therefore, silane has greater tendency to produce complexes with transition metals and alkaline earth metals such as Iron and Magnesium.

Figure 1B:
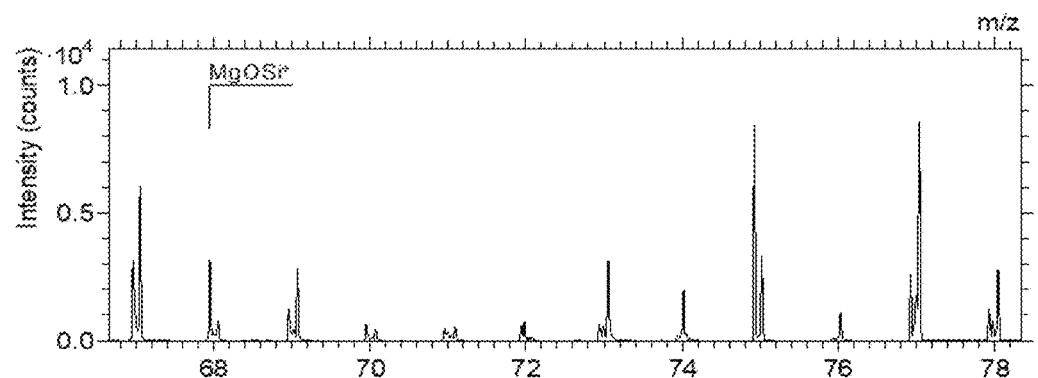

After emulsification, $C_8$ silane molecules hydrolyse to hydroxyl alcohol. Reaction between hydroxyl groups form Si—O—Mg bonds with $C_8H_{17}$ hydrophobic group and protect the SMMOC molecules from the water. Hence, water degradation of the SMMOC and potential instability of phase 5 crystals are significantly minimised, as per FIG. 1.

Although the resulting silane-modified magnesium oxychloride cement exhibits strong hydrophobicity, the porous and breathable characteristics are retained and promote good mitigation to deterioration at the interface and within the matrix, associated with entrapped water.

In order to achieve the effective protection of the MOC molecules, the calculation method of the required amount of Silane in the composition is important. The method includes 2 parts:

1. Calculate required Active silane emulsion ($M_{si}$) quantity based on the amount of MgO and $MgCl_2$ denoted as $M_{mo}$ and $M_{mcl}$ respectively; and
2. Calculate required silane quantity based on the total amount of dry solid ingredients ($M_{solid}$) apart from MgO and $MgCl_2$.

The combination of these calculated quantities of silane is added to a brine gauging solution to produce an aqueous solution before mixing with solid materials.

Moreover, adding silane as a composition seems to cause filler particles in the mixture to exhibit better dispersion. The functional group of organo-silane interacts with hydroxyl-groups on silica particles and tends to override the organic and inert mineral filler interactions to prevent agglomeration.

Various types of silane have been used to protect cement, brick and concrete surfaces from water and moisture by coating or by adding into the composition of cement, especially in the Portland cement base elements. However, it is not a cost-effective way to achieve the result sought by the present invention. In this invention, the type and amount of silane required in the composition is calculated to protect the MOC substrate effectively and economically.

In some embodiments, organic waste fibre—such as rice husk—is included in the composition to enhance the strength and durability of SMMOC. Rice husk addition exhibits improved bridging strength, tensile strength, thermal resistance and impact resistance in the matrix as well as density reduction of the matrix.

A common filler in light-weight Sorel Cement is sawdust. However, the present inventor has learnt that sawdust attracts moisture through the natural equilibrium moisture capacity of timber, which exacerbates many problems such as dimensional instability, leaching, degrading, efflorescence and corrosion of the MOC. The inventor has found that rice husk performs the filler role but without promoting moisture ingress of SMMOC in the long-term.

In some embodiments, the composition may include expanded perlite as a light-weight aggregate to enhance fire resistance due to its outstanding insulating characteristics and low thermal and acoustic conductivities. However, increasing the expanded perlite quantity in the matrix reduces the compressive and tensile strength of MOC. The inventor has determined that an effective quantity of expanded perlite in the SMMOC is within the range 1.4% to 2.5% by mass, which provides the desired strength for the SMMOC building products. The porous surface of the expanded perlite may reduce the strength of SMMOC but embodied water in the crystal structure is released on heating if the product is involved in a fire so that the integrity is retained longer.

In another embodiment, the SMMOC may include a light-weight filler such as exfoliated vermiculite together with rice rusk and perlite based on the desired strength and desired level of improve fire resistance. Fine exfoliated vermiculite, (1 mm to 2 mm) is preferred for greater effectiveness and ease of dispersion into the mixture.

In further embodiments of the invention, the SMMOC includes a combination of one or more cementitious/pozzolana industrial by-products, such as; fly ash, microsilica (Silica Fume) and/or ground granulated blast-furnace slag (GGBS), together with a cementitious binder, such as Magnesia and Magnesium Chloride Hexahydrate, to enhance the binding properties and consequently the strength and durability of SMMOC. This combination enhances the water resistance significantly.

Class F fly ash with 45 μm particle size may be added to the composition within the range of 8% to 12% by weight. Silica fume with less than 2 μm particle size and GGBS with less than 20 μm particles may be each added to the composition with the weight proportion of between 1% to 3% by mass. These particle sizes are selected to enhance the microstructural bonds within the SMMOC matrix.

Silica fume tends to enhance pozzolana, flowability, cohesiveness, and abrasion resistance in combination with GGBS, which reacts with alkali hydroxide to form strong cement paste structure in the during the early hydration process.

The pores in the SMMOC pastes are filled by the small particles of fly ash, silica fume and GGBS. As a consequence, permeability is minimized, by filling the pores, and good workability is provided during production. Minimising permeability further improves the prevention of water ingress into the SMMOC matrix. In addition to improving cementitious binding properties, the other benefits achieved are in the reduction of expansion, good particle dispersion and better fluidity of the pastes.

Although workability is increased by these cementitious materials, they may retard the setting time of the cement composition and they may extend the exothermic reaction by releasing heat slowly during the hydration process. Therefore, the quantity of the cementitious materials using in the composition is essential to be calculated carefully to achieve the designated exothermic reaction time.

The inventor has learnt that the phosphate in the MOC improves water resistance properties by reducing the solubility of needle-like crystals within the matrix. It has been found advantageous to add and 85% concentration liquid phosphoric acid solution in an amount between 0.35% and 0.5% by weight to achieve the most effective and economical result.

In another embodiment of the invention, the SMMOC includes the addition of chopped strand C-glass fibre coated with 14%-18% of zirconium oxide to promote alkali resistance and to enhance resistance to cracking.

The inventor has also determined that employing $MgSO_4$ in SMMOC instead of $MgCl_2$ to form SMMOSC—silaned modified magnesium oxysulfate cement—with the same molar ratio range (8 to 11) of $MgO/MgSO_4$ provides a similar improvement in water resistance, corrosion resistance and carbon sequestration resistance.

In other embodiments, the calculation of the fibreglass reinforcement meshes locations in the SMMOC panel are designed to comply with Australian Standard AS3600. Fibreglass mesh reinforcements are applied in this invention in order to produce thin SMMOC structural building panels. To protect the fibreglass mesh from alkali corrosion, the alkali resistant coating is specified to be between 16%-18% for this invention. AR-glass meshes are used SMMOC in thin panel products together with alkali-resistant coated C-glass. The size of the mesh is specified as (but not limited to) 5 mm×5 mm and 6 mm×6 mm and the weight is 110 g/m$^2$, 145 g/m$^2$, 160 g/m$^2$ and 220 g/m$^2$.

In another embodiment, the inventor used PVA fibre as an alternative fibre reinforcement in SMMOC. Employing PVA fibre in SMMOC improves and accelerates the manufacturing process and achieves improved product consistency and more homogeneous product. It reduces the time of changing the fibreglass mesh rolls in the process and eliminates variation of fiberglass layer placements in the products. Most importantly, it eliminates fibre reinforcement degradation due to high resistance to alkali.

To improve high bridging strength in the matrix, the PVA fibre used in this invention is 8 denier of filament diameter, 8 mm-12 mm in length, 1300 kg/m$^3$ density and with a tensile strength of 1600 MPa. This also applies to the same inclusion of PVA fibre in SMMOSC.

Method of Calculation of Required Cation Silane Emulsion

Another aspect of the invention is the method of calculating the optimal quantity of cationic active organo-silane into the magnesium oxychloride hydroxide cement composition to protect the strong crystal structure from contact with water and following by carbonation. For this purpose, the optimal quantity of silane is important to achieve the most effective and economic solution for protecting the MOC from long term moisture degradation. The method below is also applicable to the manufacture of magnesium oxysulphate cement. This calculation is as follows:

Required Quantity of Active Silane emulsion=$M_{si}$
Quantity of Magnesium Oxide=$M_{mo}$
Quantity of Magnesium Chloride Hydroxide=$M_{mcl}$
Quantity of Solid in the composition=$M_{solid}$
Solid content of silane in emulsion (%)=$\omega$ $$M_{Si} = \frac{1}{\omega} \times \frac{(M_{mo} + M_{mcl}) + 2(M_{solid})}{1000} \qquad \text{(Equation 4)}$$

Method of Manufacturing SMMOC or SMMOSC Cement

According to another aspect of the invention, there is provided the sequence of adding raw materials and the mixing process used to make SMMOC or SMMOSC cement paste. The process of manufacturing SMMOC/SMMOSC cement pastes in the production line is presented below:

Step 1: The Magnesium Chloride brine solution, with the desired concentration (about 24° Be to 27° Be) is prepared 24 hours ahead of making the composition. The brine temperature should be between 22° C. to 30° C.

Step 2: The brine is added into the mixer and followed by the phosphoric acid and the calculated amount of silane. Adding these ingredients does not change the brine pH which is about 6.5 to 8. These are mixed until well dispersed in the solution.

Step 3: The MgO is added into the alkaline aqueous solution prepared in Step 2 and mixed until dispersed well.

Step 4: The cementitious materials are added into the mixture prepared in Step 3 in the following sequence: silica fume, then fly ash, then slag. This mixture is then blended.

Step 5: The organic fibre, such as rice husk (optionally exfoliated vermiculite) and the light-weight aggregate perlite are added to the mixture prepared in step 4, followed by the chopped strand fibre. Expanded perlite is added near the end of the process in order to avoid it floating over the surface of the composition. The viscosity and the temperature of the paste are checked before placing into moulds.

Step 6: Once cast in the moulds, the SMMOC/SMMOSC wet samples/products are cured at room temperature with Relative Humidity (RH) between 65% and 70%. The curing temperature should not be less than 20° C.

Method of Manufacturing SMMOC/SMMOSC Lightweight Building Panels

According to another aspect of the invention, there is provided a method of manufacturing lightweight SMMOC/SMMOSC panels for building.

The production procedures presented above is followed by the procedure of making the light weight SMMOC/SMMOSC building products.

The panels are composed of 3 SMMOC/SMMOSC layers with design fibreglass reinforcement meshes in between. Fibreglass meshes used in these panels may vary in types, numbers and setting locations based on the structural requirement of the particular product. The location of the fibreglass reinforcement in the SMMOC/SMMOSC panels are calculated in accordance with AS3600. Said panels are produced for the application of flooring and walling. Due to the higher design load requirement, flooring product includes more reinforcement than that in walling products.

As an alternative reinforcement in the SMMOC/SMMOSC panel manufacturing, PVA fibre is applied. The most effective and efficient quantity of PVA fibre that is in the range of 0.5 to 2% by weight is selected based on experimental results in this invention. PVA fibre are added into the admixture at the Step 5 of method of manufacturing SMMOC/SMMOSC cement and 1 to 3 SMMOC/SMMOSC layers can be placed on the mould without applying fiberglass meshes between the sandwich layers resulting homogeneous admixture pastes and less steps of the manufacturing procedures.

As SMMOC/SMMOSC light-weight building panels can be used as a finished product, appearance of top and bottom surfaces are designed to be fine and homogeneous in colour whereas the middle layer aims for light weight. Therefore, the SMMOC mixture for the top and bottom (outer) layers will usually exclude expanded perlite due to the undesirable visibility of perlite in the finished surface. However, expanded perlite will be included in the middle layer of SMMOC/SMMOSC. For easy reference, the mixers for bottom layer paste, middle layer paste and bottom layer paste are named below as: Mixer 1, Mixer 2 and Mixer 3 respectively. In the SMMOC/SMMOSC panel production, Step 5 above is followed by Step 7 below.

Figure 2:
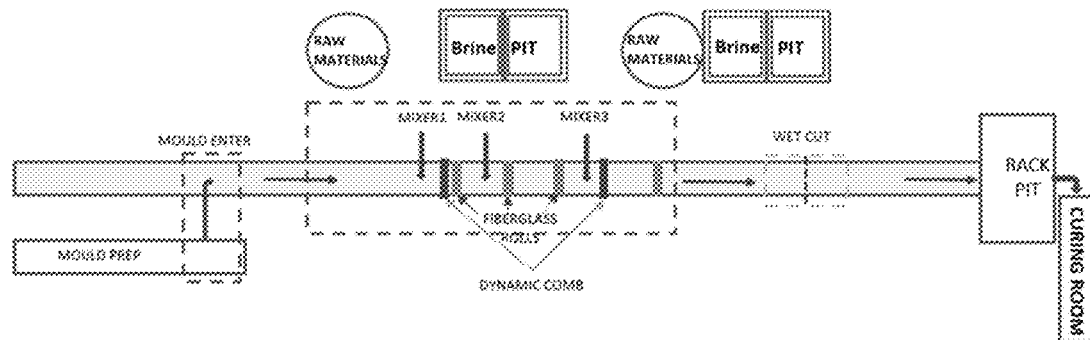
FIG. 2 is a flowchart showing an automated production system for light weight SMMOC building products.

Step 7: Before releasing the SMMOC/SMMOSC composition from the mixers to the moulds in the SMMOC/SMMOSC products production line as shown in FIG. 2, the viscosity and temperature of the mixtures are measured to be consistent for all batches. The composition in Mixer 1 is discharged to the cleaned mould on which a very thin layer of form releasing agent is applied. A "dynamic comb" is included as a component of this invention and is placed on the bottom layer of paste before the first fibreglass roller. The comb provides uniform distribution of the paste on the surface of the mould as well as removing the air bubbles from the slurry mixture to minimise the formation pin-holes of the entrapped air bubbles at the finished surfaces. Similarly, the comb is applied on the topmost layer of the slurry paste after discharge from last Mixer of the production line, see FIG. 3 for an illustration of the dynamic comb.

Step 8: The alkali resistance coated fibreglass or AR-glass mesh is applied at the desired level from the bottom. Screeding or trowelling is applied on the pastes above the layer of first fibreglass mesh to get the homogenous and well-distributed paste under the fibreglass mesh at the surface on the mould.

Step 9: Mixer 2 composition is divided into 3 to 5 sub-hoppers to discharge on the first layer from Mixer 1 according to the requirement of layers of fibreglass meshes of the particular SMMOC products.

Figure 3:
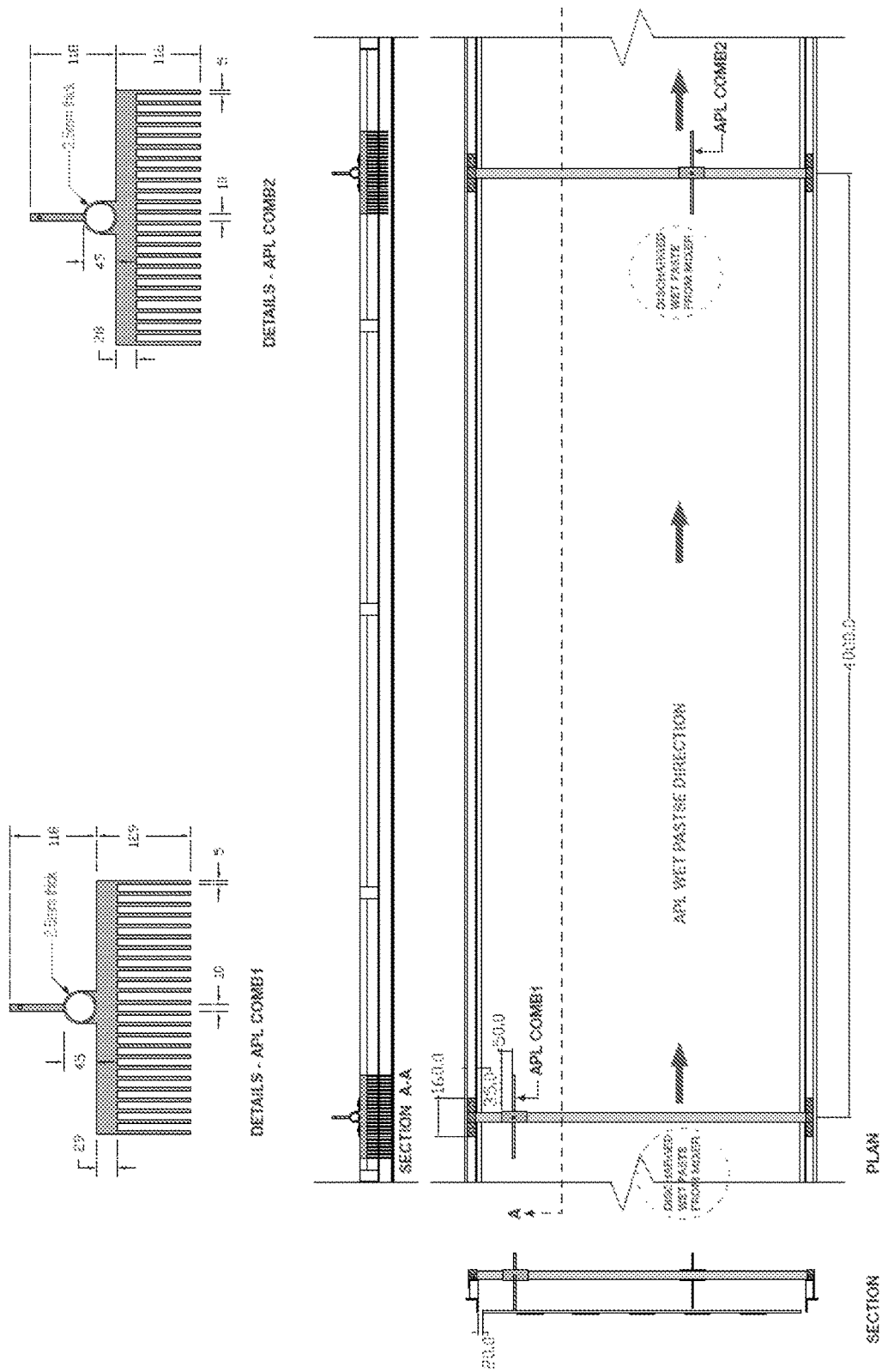
FIG. 3 shows an APL dynamic comb system.

Step 10: The slurry from Mixer 3 is discharged on the final layer of fibreglass reinforcement mesh on top of the first two SMMOC slurry layers from Mixers 1 and 2 which are already in place. As mentioned in Step 7, the dynamic comb is used after the point of discharge of Mixer 3 slurry for even dispersion of the slurry and removing air bubbles from the pastes to minimize surface pin holes defects on the finished surfaces (FIG. 3).

Step 11: After placing the slurry on the moulds in the production line, the wet products move along the conveyor and a synchronized saw is used to cut the desired length of the wet SMMOC products, located at the point between completion of wet paste slurry placing and positioning into the tract to move to the curing room.

Step 12: SMMOC is air cured as shown in Step 6. However, the temperature and humidity in the curing room is controlled to achieve consistent and effective production. When the temperature is lower than 5° C. in the curing room, the slow exothermic reaction delays the consecutive processes in the production line. Similarly, high humidity may delay the demoulding process because SMMOC is non-hydraulic cement.

In the present invention, in order to maintain a simple and affordable curing room process, an endothermic heating system, ventilation and water spray to control the temperature and humidity of the curing room are provided. The temperature and humidity range of the curing room is preferred to be 23° C.±1 to 33° C.±1 and 65%±2 to 70%±2 respectively. The SMMOC panels are cured in the above controlled room for a minimum of 24 hours before demoulding.

Step 13: After the demoulding, the SMMOC panels are required to have profiles according to the particular design or use of the product. At a first step, trimming the edges of the SMMOC panels and sanding the top surface of the panels to level the surface is carried out. Then all the boards are stacked to prevent cupping and bowing during the waiting period for the other processes.

Step 14: The SMMOC panels are continuously processed through sanders, profilers and honers in accordance with particular design required of the final product.

The following table A shows the properties of the SMMOC during the curing process.

TABLE A

Properties of SMMOC During Curing.

| Samples/Days | Properties | 3 | 7 | 30 | $f_c'$ |
|---|---|---|---|---|---|
| Sample 1 | MOR | 9.7 | 10.4 | 11.7 | 40.9 |
|  | MOE | 8.0 | 8.4 | 11.7 |  |
| Sample 2 | MOR | 9.3 | 9.06 | 8.85 | 33.6 |
|  | MOE | 7.6 | 8.23 | 7.8 |  |
| Sample 3 | MOR | 7.85 | 7.90 | 8.40 | 37.8 |
|  | MOE | 8.35 | 8.39 | 9.55 |  |
| Sample 4 | MOR | 9.7 | 10.4 | 9.74 | 41.2 |
|  | MOE | 8.0 | 8.4 | 11.7 |  |
| Sample 5 | MOR | 9.5 | 11.03 | 11.5 | 34.5 |
|  | MOE | 8.7 | 7.9 | 8.73 |  |

MOR = Modulus of Rupture (MPa)
MOE = Modulus of Elasticity (GPa)
$f_c'$ = Compressive Strength (MPa)

The following table B shows the mechanical properties of an alternative SMMOC incorporating PVA fibre during the curing process.

TABLE B

Properties of SMMOC Mortar with PVA fibre.

| Samples/Days | Properties | $f_c'$ | 3 | 7 | 30 | 180 | 360 |
|---|---|---|---|---|---|---|---|
| Sample 6 - PVA | MOR | 55.7 | 6.2 | 5.5 | 6.7 | 7.7 | 8.4 |
|  | MOE |  | 8.0 | 8.0 | 9.9 | 9.5 | 11.7 |

The following table C shows the mechanical properties of an alternative SMMOC incorporating fibreglass mesh reinforcement during the curing process.

TABLE C

Properties of SMMOC Panels with Fibreglass Mesh Reinforcement (RS).

| Examples/Days | Properties | 3 | 7 | 30 | 180 | 360 |
|---|---|---|---|---|---|---|
| Sample 1 | MOR | 23.29 | 24.6 | 24.7 | 26.8 | — |
|  | MOE | 6.82 | 8.15 | 8.60 | 8.68 | — |
| Sample 3 | MOR | 25.71 | 27.96 | 28.19 | 30.97 | — |
|  | MOE | 4.40 | 4.60 | 4.70 | 6.07 | — |
| Sample 3 | MOR | 20.35 | 21.6 | 26.5 | 29.4 | 32.6 |
|  | MOE | 5.74 | 5.47 | 6.49 | 6.91 | 6.72 |
| Sample 4 | MOR | 20.36 | 21.6 | 26.5 | 29.4 | 32.6 |
|  | MOE | 6.31 | 6.36 | 7.20 | 8.02 | 8.23 |

The Profiles of Light-Weight SMMOC Panels

As an example of the type of product that can be made form SMMOC/SMMOSC, there are described herein four panels refractory building construction materials that are designed for improved functionality, such as fire resistance, acoustic performance, etc., and also to meet architectural aesthetic design and simple and easy installation on site. These SMMOC panels are named below as SMMOC WEATHERBOARD, SMMOC INSTACLAD, SMMOC EXPRESS and SMMOC DECKRACE. Among these profiles, three are applicable for external wall cladding (EWC), one for internal wall use and one for external decking.

External Wall Cladding (EWC): SMMOC WEATHERBOARD

Figure 4:
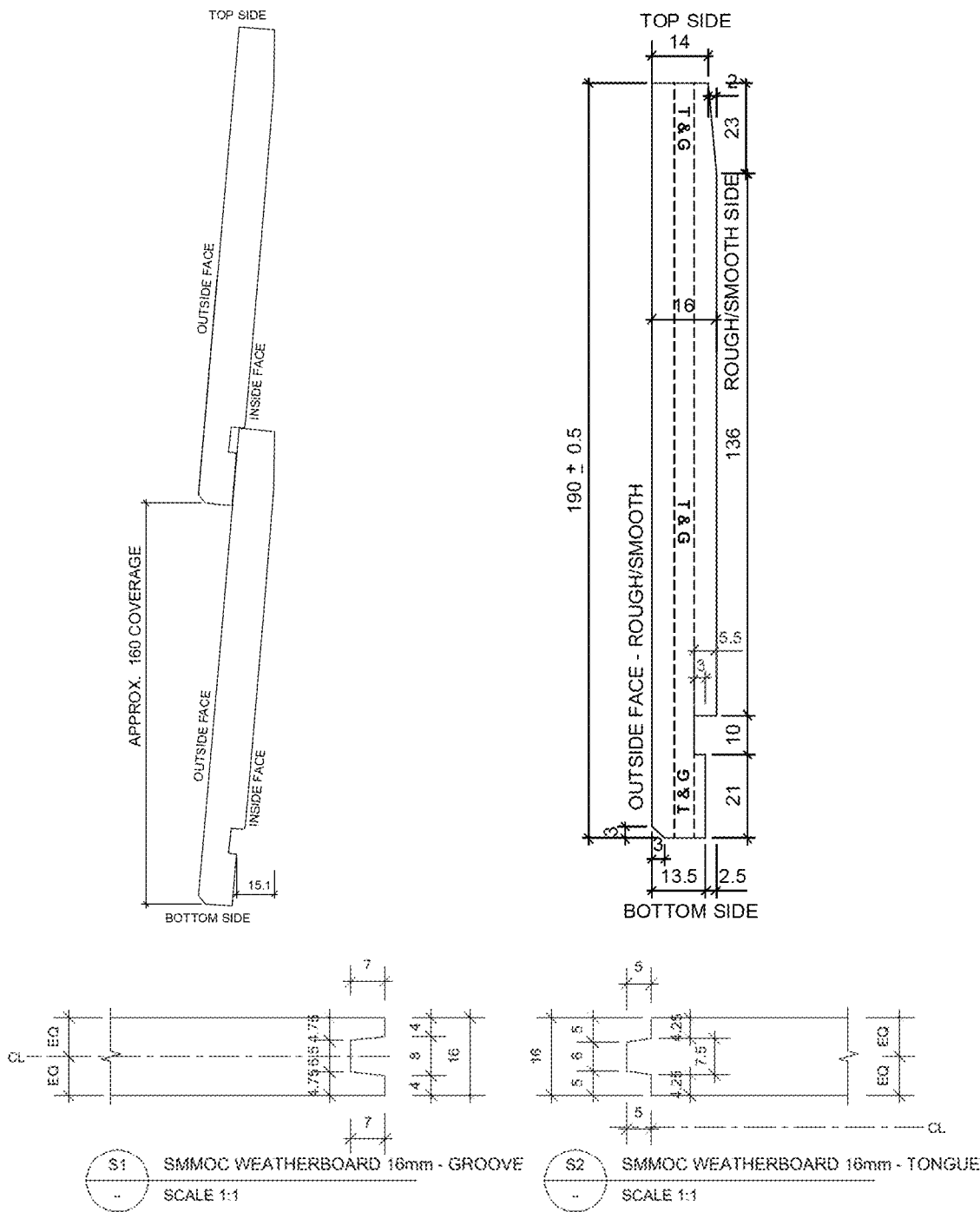
FIG. 4 shows external wall cladding made from SMMOC (Profile 1—SMMOC WEATHERBOARD).

With reference to FIG. 4, there is disclosed an external wall cladding (EWC) profile 1: SMMOC WEATHERBOARD is especially designed for improving fire protection, having tongue and groove and notched edges at one side and 8.5:100 slope at the other end to be flat at the frame. The notch is designed as 3 mm×10 mm×5.5 mm in the longitudinal direction.

The notched profile aims for: locking the consecutive boards on the previous boards; protecting the fire from getting through inside; and allowing one-person installation due to self-gauging properties to save time and be cost effective.

The tongue and groove is also designed for sealing the claddings from fire and weather. The SMMOC WEATHERBOARD profile can be designed to achieve fire rating level (FRL) for 1 hour—FRL 60/60/60 in accordance with AS1530.4.

External and Internal Wall Cladding (EWC)—SMMOC INSTACLAD

Figure 5:
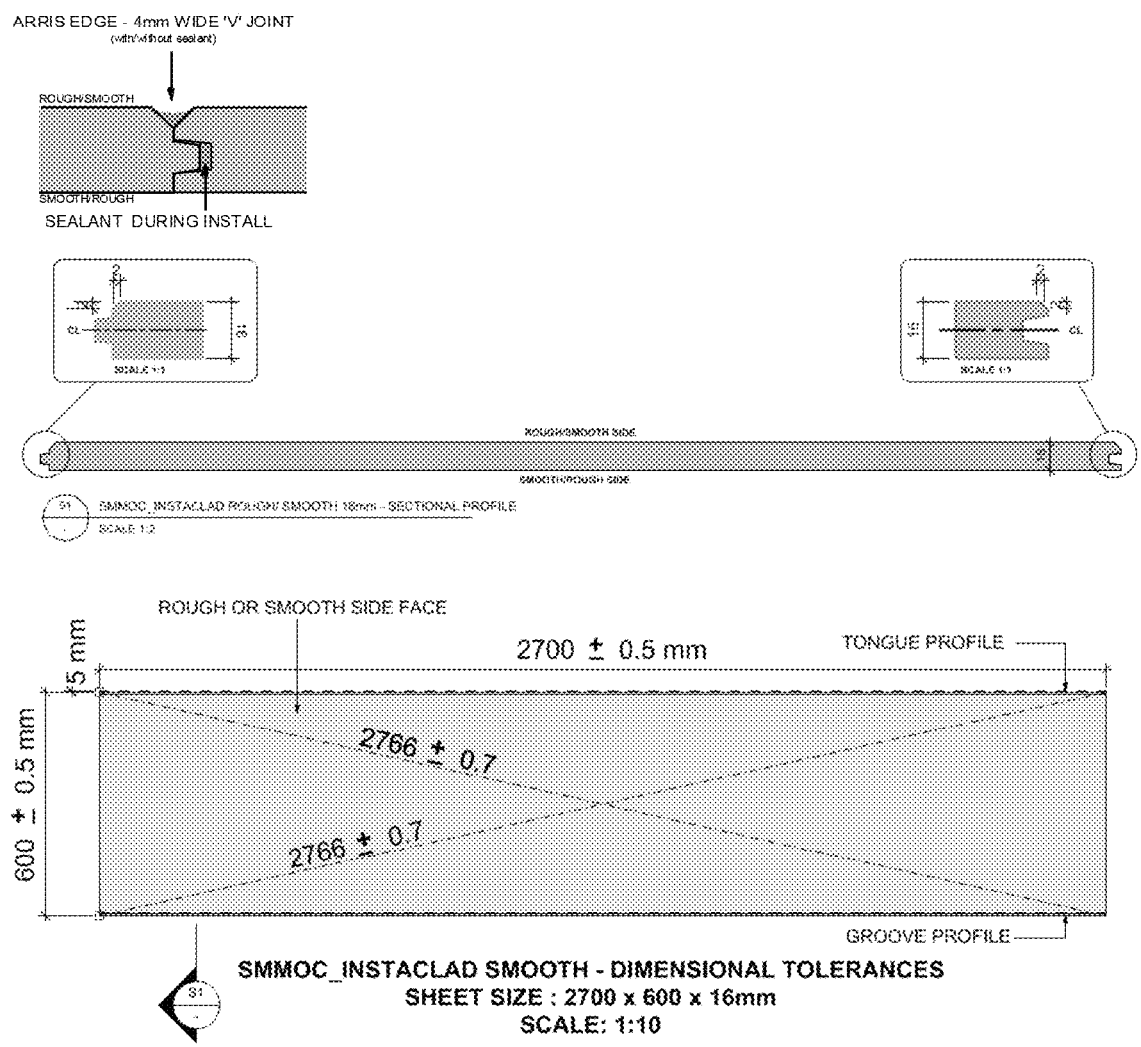
FIG. 5 shows external/internal wall cladding made from SMMOC (Profile 2—SMMOC INSTACLAD).

With reference to FIG. 5, there is disclosed Profile 2: SMMOC INSTACLAD, which is designed for external and internal wall cladding. SMMOC INSTACLAD is 9 mm to 19 mm thickness with 1.8 m to 3.0 m in length and 0.6 m to 1.2 m width panels with tongue and groove, and 2 mm×2 mm Arris edges.

A known defective optical illusion experienced in installation of wall cladding panels, such as appearance of wave, cracks and out of plumb at the abutting edges of the finished wall cladding panels can be observed under the glancing light, especially on high-rise walls. The Arris edges designed in this invention: minimize this undesired optical illusion; express the joints and allow tolerance at the manufacturing process and the final assembly; allow for a thin membrane coating (such as paint) to be applied without concern for the paint cracking at the joints; prevent the edges from chipping/damage during the installation; provide smooth and neat joint connection; and minimize surface tension at the joints of the finished products.

Tongue and groove joins are provided to seal the panels to prevent moisture ingress. In addition, external wall cladding panels are locked with tongue and groove joins in the case of fire so that it improves its fire rating in the EWC system. Wall systems with SMMOC INSTACLAD can achieve a fire rating level up to 2 hours, FRL-/120/120, under AS1530.4 and show a resistance to wind load up to 4 kPa.

External Wall Cladding (EWC) Profile 3: SMMOC EXPRESS

Figure 6:
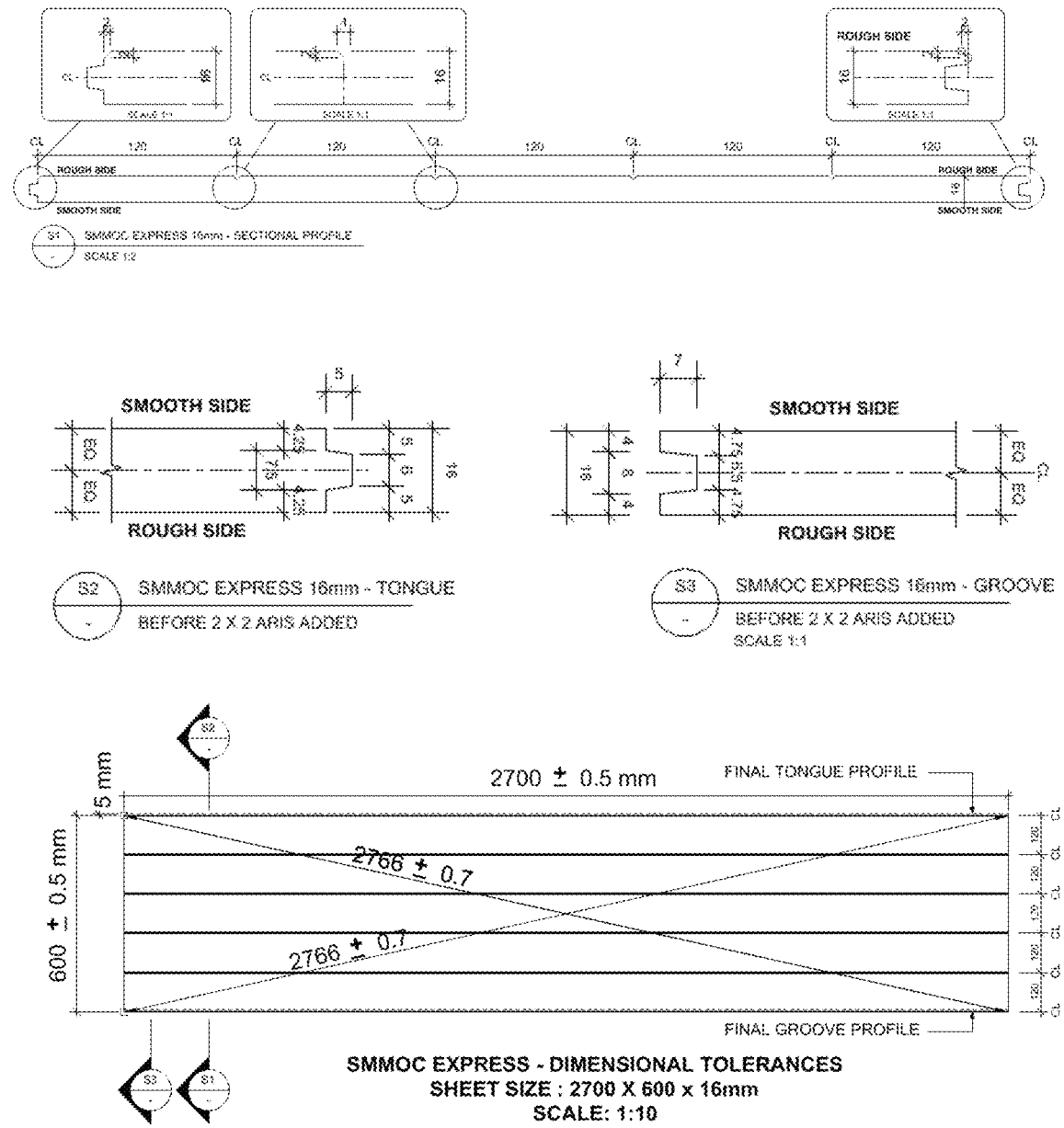
FIG. 6 shows external wall cladding made from SMMOC (Profile 3—SMMOC EXPRESS).

With reference to FIG. 6, thee is disclosed external wall cladding profile 3 SMMOC EXPRESS which is designed for appearance, fire resistance and water resistance. This profile includes five V-grooves (2 mm×2 mm) along its length. It includes tongue and groove joins and 2 mm×2 mm Arris edges.

A known optical illusion defect observed in the installation of wall cladding panels can cause the appearance of waves, cracks and 'out of plumb' alignment at the abutting edges of the finished wall cladding panels can usually be observed under glancing light, especially on high-rise walls. The Arris edges: minimize those undesired optical illusions; express the joints and allow tolerance at the manufacturing process and the final assembly; allow for a thin membrane coating (such as paint) to be applied without concern for the paint cracking at the joints; minimize the surface tension of the finished products; prevent chipping edges during the installation and painting process; provide smooth and neat joint connections.

Tongue and groove joins are used to seal the panels from the moisture ingress. In addition, these external wall cladding panels are locked with tongue and groove joins in the case of fire so that it improves its fire rating in the EWC system. The SMMOC EXPRESS profile achieves a fire rating level up to 2 hours, FRL-/120/120, under AS1530.4 and provides resistance to wind load up to 4 kPa.

External Decking—Profile 4: SMMOC DECKRACE

Figure 7:
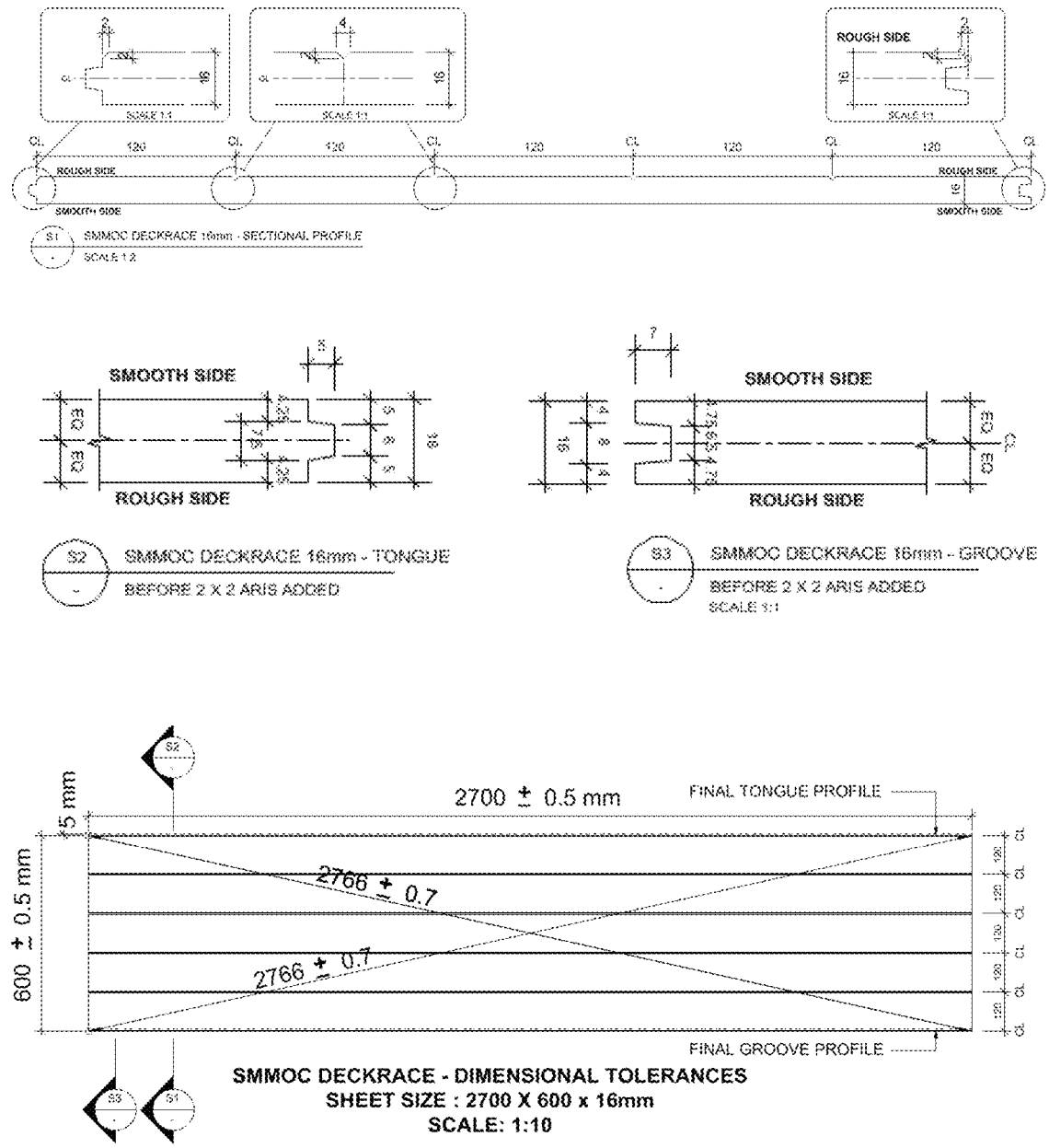
FIG. 7 shows external decking made from SMMOC (Profile 5—SMMOC DECKRACE).

With reference to FIG. 7, there is disclosed an external decking profile: SMMOC DECKRACE that is designed for faster installation, fire resistance and water resistance compared to traditional timber decking. The SMMOC DECKRACE profile includes 2 mm×2 mm V-grooves along its length to appear as five small decking panels on one board. It includes tongue and groove joins to seal the board from moisture and protect it from the fire. A SMMOC DECKRACE installation accelerates the construction process so that tends to make it a more economical product compared to the installation of timber decking.

SMMOC DECKRACE exhibits excellent fire resistance, therefore it can be used in the Bushfire Attack Level and Flame Zone (BAL/FZ).

The materials used in each of the panel embodiments described above are specified below in Table 1:

TABLE 1

| Materials | Specification |
|---|---|
| Light Burnt Magnesia | Kiln Temperature between 800° C. to 1000° C. |
| | Purity 80% to 98% |
| | Activity 60% to 68% |
| | CaO < 5% |
| | Ignition < 9% |
| Magnesium Chloride Hexahydrate (or Magnesium Sulphate Heptahydrate) | Purity 97% to 99% |
| Fly Ash | Class F-Fly Ash, <45μ |
| Silica Fume | <2μ |
| Slag | <45μ |
| Rice Husk | Length: 4 mm |
| | Aspect ratio: 12.5 |
| Expanded Perlite | Water Absorption (%) 47 |
| | 1 mm-3 mm |
| Chopped Strands | 6-8 mm length- Alkali coated C-glass |
| Phosphoric Acid | 85% concentration |
| Silane Emulsion | 20%-60% of active silane content with less than 20 nm particles. |

Below in table 2 are disclosed example compositions of silaned modified magnesium oxychloride cement (SMMOC) according to the invention in the re composed of the following elements as shown in the Table. The percentage are calculated based on the dry weight of total materials.

TABLE 2

| | Composition Proportion (%) | | | |
|---|---|---|---|---|
| Components | Example 1 | Example 2 | Example 3 | Example 4 |
| Light burnt Magnesia | 49 | 45 | 47 | 43 |
| Magnesium Chloride Hexahydrate | 21 | 23 | 25 | 25 |
| Cementitious materials (Fly Ash + Silica Fume + GGBFS) | 17 | 19 | 18 | 15 |
| Expanded Perlite | 0 | 3 | 3 | 0 |
| Organic Fibre | 10 | 9.5 | 10 | 10 |
| Exfoliated Vermiculite | 0 | 0 | 0 | 5 |
| Phosphates/Phosphoric Acid | 0.50 | 0.5 | 0.5 | 0.4 |
| Organo-functional Cationic Silane | 0.25 | 0.2 | 0.25 | 0.2 |
| Water (by weight of dry weight of cement materials) | 40 | 45 | 50 | 58 |

The purity and activity of light burnt magnesium oxide (kiln temperature 700° C.-800° C.) should be in the range of 80% to 98% and 60% to 68% respectively and surface area of Magnesia is between 120 m$^2$/kg to 150 m$^2$/kg.

The crystal form of magnesium chloride (or magnesium sulphate) with 97%-99% of purity includes 18% to 25% by weight of dry SMMOC composition.

The magnesium chloride brine is prepared by dissolving magnesium chloride crystals in the required amount of potable water for the desired concentration to make SMMOC composition 24 hours before using in the composition. The brine is to be stored at room temperature above 20° C. The magnesium sulphate brine is prepared in the same way.

The phosphoric acid and silane emulsion are added to the brine and blended to get an active aqueous solution in the first step of producing the SMMOC.

Figure 10:
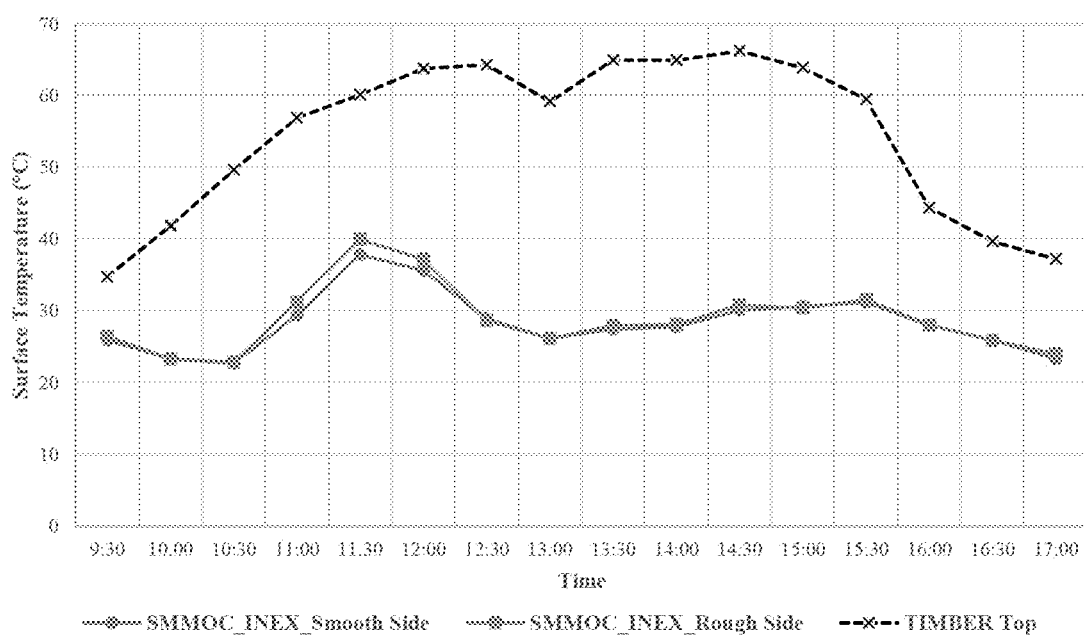
FIG. 10 shows surface temperature comparison of a SMMOC panel compared with timber in sunlight.

The surface temperature of the SMMOC is stable after a few hours under the sun. The surface temperature of SMMOC is stable around 28° C.±3° C. after about 3 hours under the sun whereas the timber exhibits increasing trend of temperature during the day (FIG. 10).

The SMMOC provides lower temperature surface compared with timber under the same weather condition. In the example, on a sunny day with maximum ambient temperature 35° C., the surface temperature of SMMOC tends to be about 50% lower than that of timber during 9:30 am to 5:00 pm, as shown in table 3 below and in FIG. 10.

TABLE 3

Surface Temperature of SMMOC panel & Timber under daylight
Sunny Day-Max Ambient Temp-35° C.
Surface Temperature (° C.)

| Time | 9:30 | 10:00 | 10:30 | 11:00 | 11:30 | 12:00 | 12:30 | 13:00 | 13:30 | 14:00 | 14:30 | 15:00 | 15:30 | 16:00 | 16:30 | 17:00 |
|---|---|---|---|---|---|---|---|---|---|---|---|---|---|---|---|---|
| SMMOC_IEX_Smooth Side | 25.97 | 23.28 | 22.72 | 29.40 | 37.85 | 35.62 | 28.92 | 26.18 | 27.45 | 27.75 | 30.19 | 30.65 | 31.18 | 27.96 | 25.97 | 23.32 |
| SMMOC_IEX_Rough Side | 26.48 | 23.32 | 22.90 | 31.27 | 39.95 | 37.18 | 29.63 | 28.17 | 27.97 | 28.12 | 30.82 | 39.38 | 31.57 | 28.07 | 25.90 | 24.02 |
| TIMBER Top | 34.75 | 41.85 | 49.65 | 56.93 | 60.13 | 63.77 | 64.30 | 59.18 | 64.97 | 64.93 | 66.23 | 63.87 | 59.52 | 44.38 | 39.68 | 37.25 |

The cupping and bowing issues of thin magnesium oxychloride cement panels during their service life is significantly minimized because of the stable surface temperature properties.

The setting times of SMMOC are 3-4 hours of initial setting time and 4.5 to 6 hours final setting time so that the workability is good enough to be produced by an automatic manufacturing production system.

The SMMOC exhibits high water resistance which the generic MOC does not have. The reduction of flexural strength is within 95% to 110% when the specimens are placed under water at room temperature (20° C. to 40° C.) for 7 days, 30 days or 90 days, as illustrated in Table 4 below.

TABLE 4

Water Resistance of SMMOC (After immersing under tap water for 56 days)

| Age of the sample (Days) | Immersion underwater (25° C.) (Days) | Weight Loss (%) | MOE Retention Ratio | Flexural Strength Retention Ratio |
|---|---|---|---|---|
| 90 | 7 | <0.2% | 0.721 | 0.892 |
| 90 | 28 | 0 | 0.718 | 0.882 |
| 90 | 56 | <0.2 | 0.972 | 1.045 |

The SMMOC exhibits low water absorption rates of less than 0.001 ml/min and the amount of total water absorption is less than 7% by weight, as illustrated in table 5 and 6 below.

TABLE 5

Water absorption specimens under water for 7 days.

| Duration under Water (Days) | Loss of mass by weight (%) | Water Absorption by Weight (%) |
|---|---|---|
| 90 | <7% | <8% |
| 30 | <4% | <7% |
| 7 | <0.2% | <7% |
| 1 | — | <8% |

TABLE 6a

Water Absorption Rate by Karsten Tube method.

| Age (days) | Water Absorption Rate (ml/min) |
|---|---|
| 3 | 0.000354-0.001083 |
| 7 | 0.000250-0.001000 |
| 30 | 0.000146-0.000167 |
| 60 | 0.000125-0.000229 |

Table 6b below shows similar results for SMMOC incorporating PVA fibre.

TABLE 6b

Water Absorption Rate for SMMOC with PVA fibre via Karsten Tube method.

| Age (days) | Water Absorption Rate (ml/min) |
|---|---|
| 3 | 0.000167-0.000229 |
| 7 | 0.000167-0.000229 |
| 30 | 0.000104-0.000167 |

The flexural strength and modulus of elasticity of SMMOC are stable when the specimens are placed under 60° C. water (warm water) for 24 hours, as shown in table 7 below.

TABLE 1

SMMOC Warm Water Resistance for 24 hours immersion at 60° C.

| Age of the sample (Days) | Immersion underwater (60° C.) (Hours) | Flexural Strength Retention Ratio |
|---|---|---|
| 7 | 24 | 1.0 |

Figure 11:
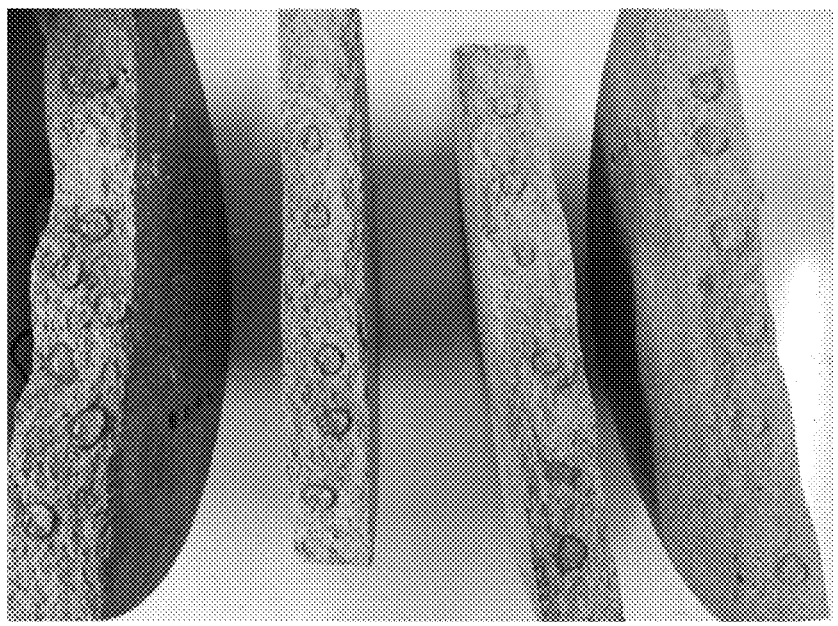
FIG. 11 is a photograph showing a water beading test being conducted on SMMOC material.

The SMMOC shows longer water beading results on both rough and smooth surfaces, as illustrated in table 8 below and FIG. 11.

TABLE 8

Appearance Density - AS2908.2 and water beading on SMMOC surface

| Specimen Dry Weight (g) | Volume of Water (ml) | Appearance Density (g/cm3) | Water beads on the surface |
|---|---|---|---|
| 189.49 | 131.5 | 1.441 | 14 hours 40 min |
| 147.72 | 126.4 | 1.169 | 9 hours 10 min |

Figure 15:
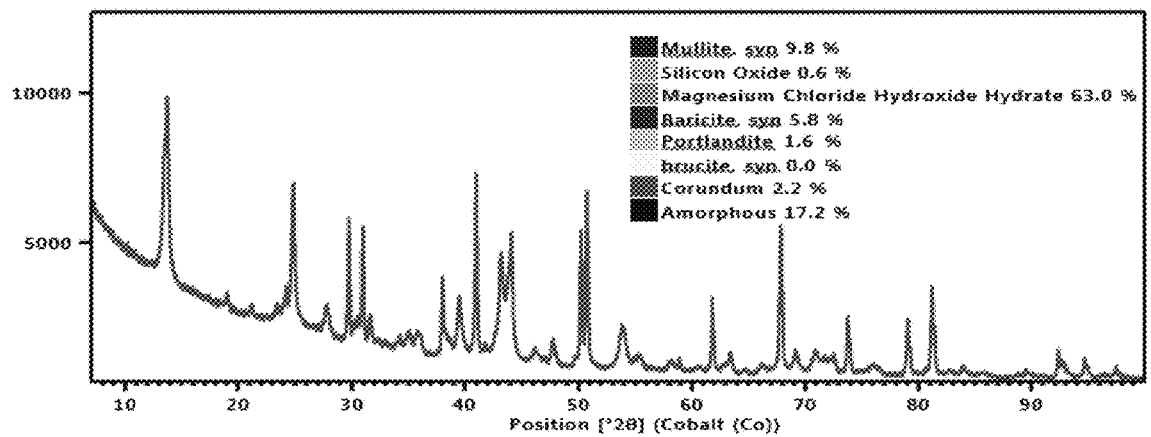
FIG. 15 is an X-Ray diffraction test on SMMOC according to the invention showing no development of brucite in SMMOC matrix.

SMMOC exhibits no carbon sequestration after 15 months because no magnesite occurs in micromechanical analysis. It also shows no formation of brucite after exposure to weather for more than 1 year as shown in X-ray Diffraction Analysis of FIG. 15. SMMOC according to the invention also shows no formation of free Cl⁻ ions in X-ray diffraction after immersing in water for 30 days, as per FIG. 15.

Figure 16:
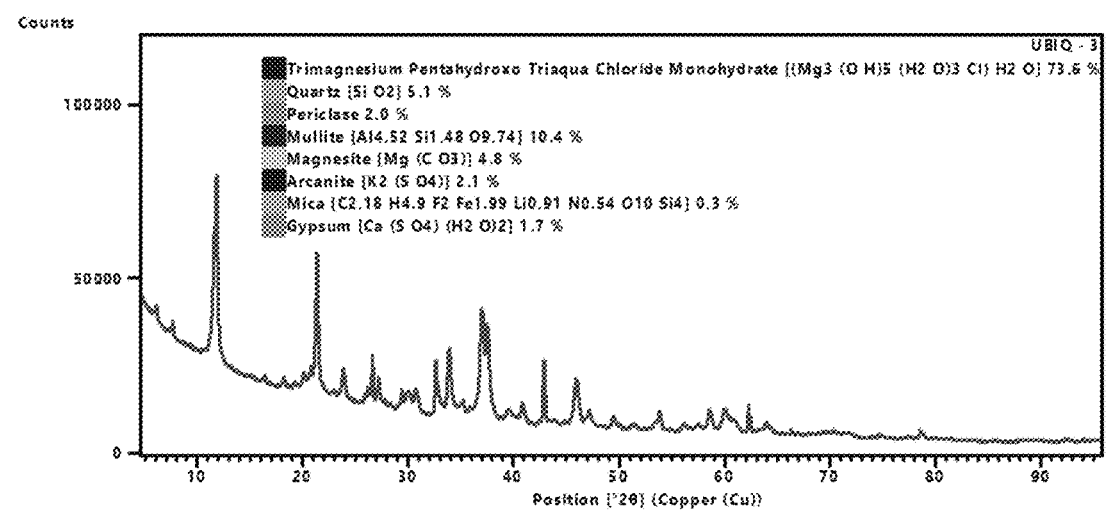
FIG. 16 is an X-Ray diffraction test on SMMOC according to the invention incorporating PVA fibre showing no development of brucite in SMMOC matrix.

The same can be observed in an alternative embodiment where PVA fibre is incorporated in the SMMOC, as per FIG. 16.

Figure 17:
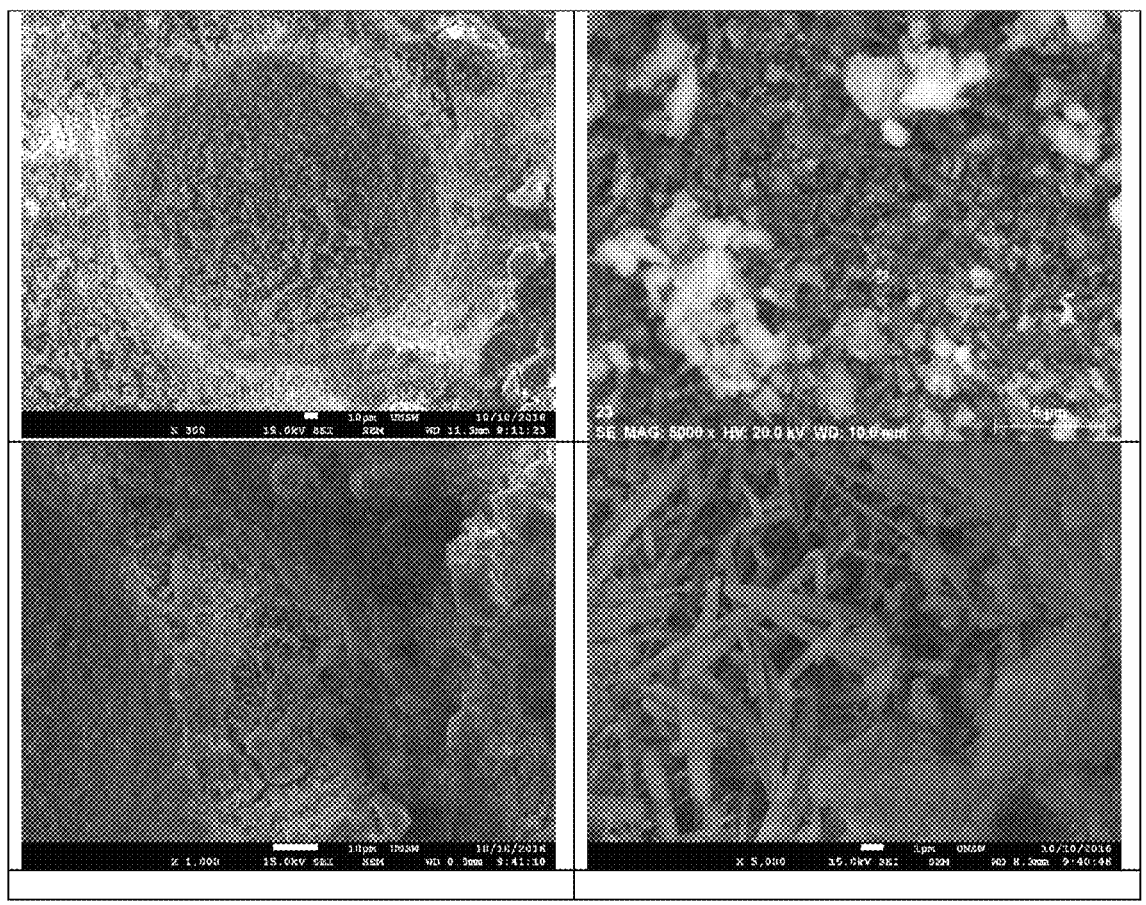
FIG. 17 shows an SEM graphic of interlocking needle-like SMMOC that has been air-cured for 28 days.

SMMOC exhibits that the pores and the cracks are filled with phase 5 crystals in the SEM analysis shown in FIG. 17, wherein it can be observed the interlocking needle-like structure of the SMMOC after 28 days air-cured.

Figure 12:
FIG. 12 is a photograph of the results of the test as per FIG. 11.
Figure 13:
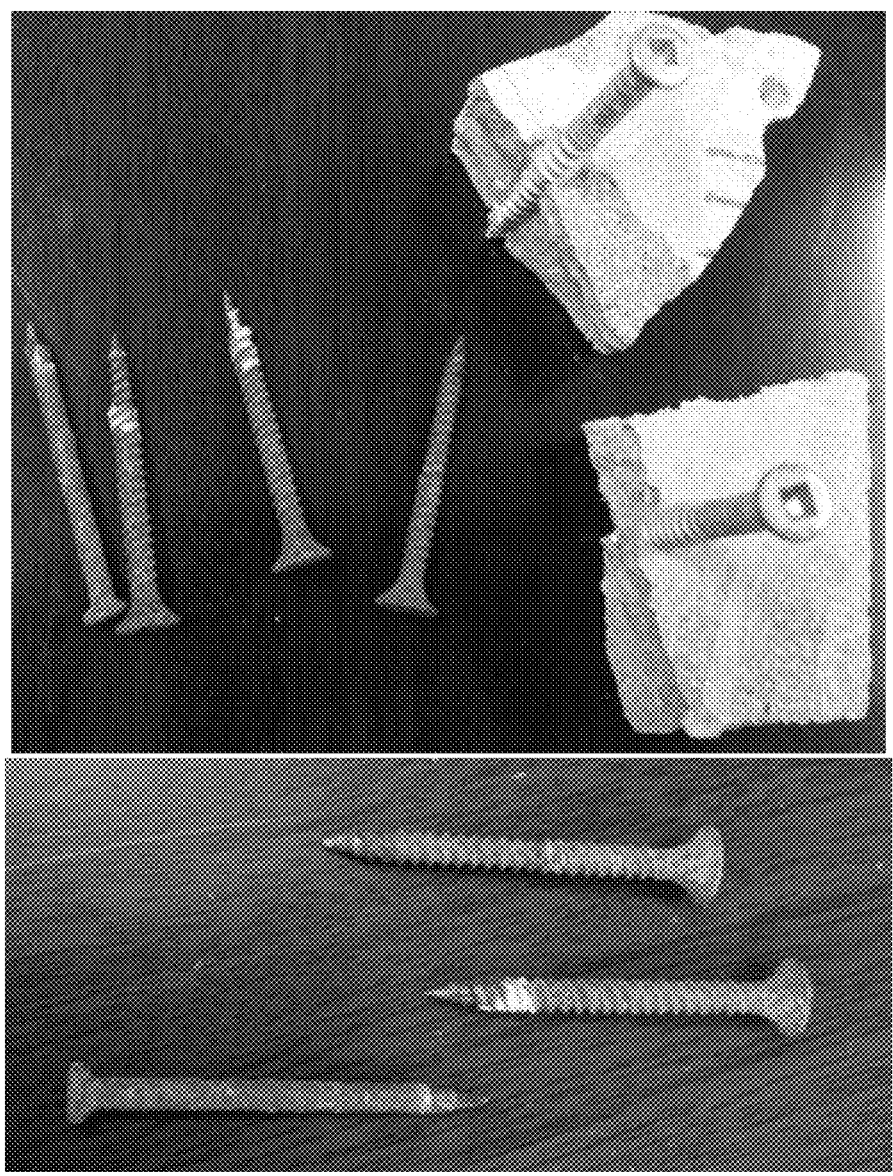
FIG. 13 is a photograph that illustrates a corrosion test on steel screws inserted in SMMOC according to the invention.
Figure 14:
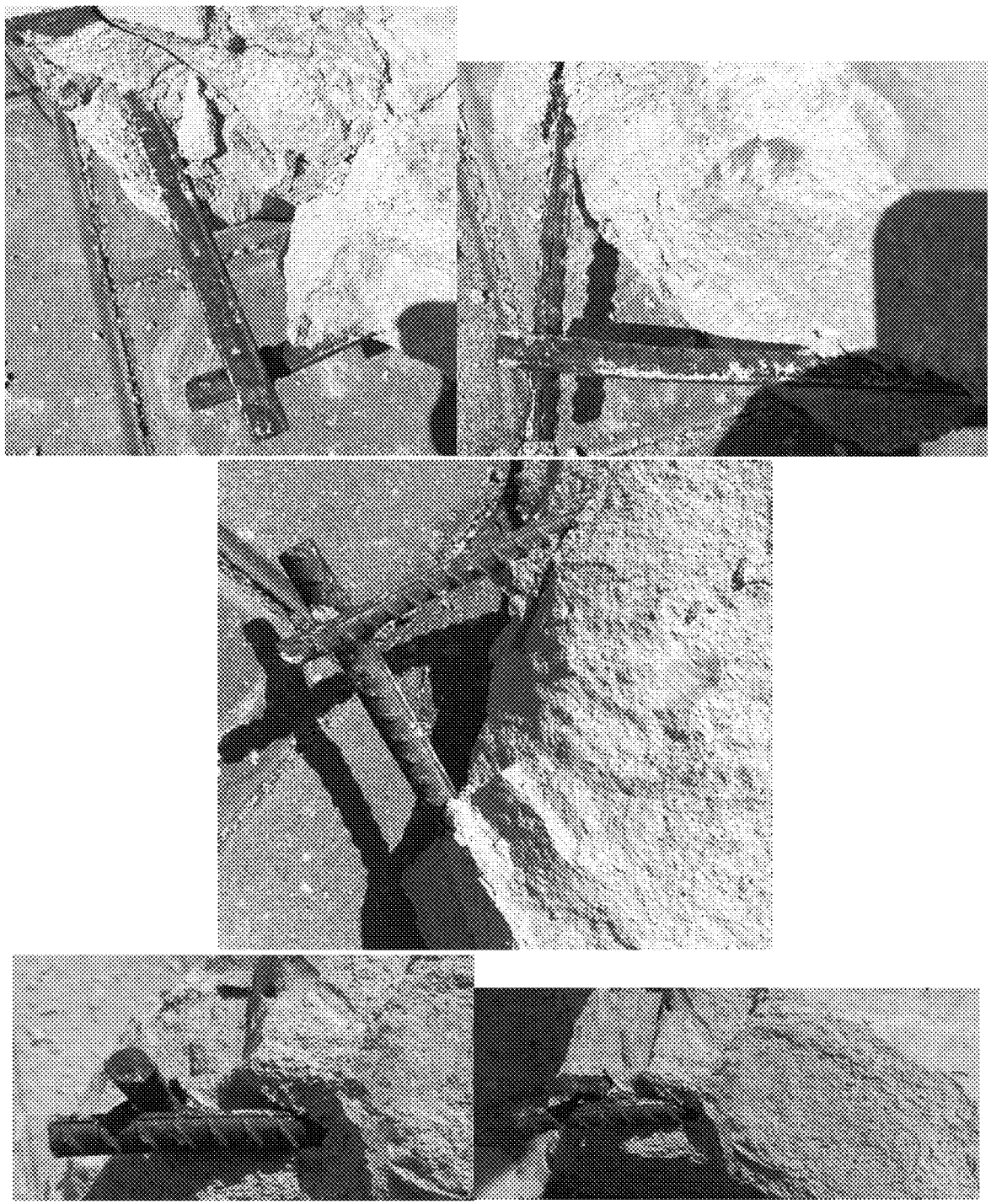
FIG. 14 is a photograph that illustrates a corrosion test on steel reinforcing bars inserted in SMMOC according to the invention.

SMMOC exhibits no corrosion on galvanised screws in contact with the SMMOC, and significantly minimizes corrosion on steel reinforcement bars, as illustrated below in tables 9 and 10 and in FIGS. 12, 13 and 14.

The silane modified magnesium oxychloride cement improves corrosion resistance significantly. In this invention, corrosion of screws and reinforced deformed bars are used to perform the corrosion resistance of SMMOC. The tests are carried out under the conditions with the temperature range of 10° C.-42° C. and exposed to the weather with humidity between 65%-100%.

SMMOC specimens were tested with four types of fixings embedded in the SMMOC and placed in the identified environment for a specific time period.

| Type of Fasteners | ID |
|---|---|
| Iron Nails | 1 |
| Galvanised coated Iron Nails | 2 |
| Galvanised Screw (star) | 3 |
| Galvanised Screw (sink head) | 4 |

TABLE 9

Corrosion Test of SMMOC with different types of Screws.

| Test No. | Specimens Dimension | Fixing ID | Condition | Temp Range ° C. | Duration Days | Outcomes |
|---|---|---|---|---|---|---|
| 1 | 100 × 100 × 16 | 1, 2, 3, 4 | Lab | 15-30 | 90 | No sign of corrosion on any of fixings and the board. |
| 2 | 100 × 100 × 16 | 1, 2, 3, 4 | Water | 10-42 | 90 | Exposed part of iron nails are corroded but not at the surface of immersed in the specimen. |
| 3 | 600 × 250 × 16 | 1, 2 | Exposed to weather | 10-42 | 90 | Exposed part of iron nails are corroded but not at the surface of immersed in the specimen. |

TABLE 9-continued

Corrosion Test of SMMOC with different types of Screws.

| Test No. | Specimens Dimension | Fixing ID | Condition | Temp Range ° C. | Duration Days | Outcomes |
|---|---|---|---|---|---|---|
| 4 | 600 × 250 × 16 | 1, 2 | Exposed to weather | 10-42 | 90 | Exposed part of iron nails are badly corroded but not at the surface of immersed in the specimen. |

TABLE 10

Corrosion Test of SMMOC with 10 mm steel bar.

| Test No. | Specimens Dimension | Fixing ID | Condition | Temperature Range ° C. | Duration Days | Outcomes |
|---|---|---|---|---|---|---|
| 1 | 600 × 250 × 100 Example 1 | Deformed Bar | Exposed to weather | 10-42 | 90-180 | Observed slightly rust but no additional rust occurred during 3 months to 6 months tests |
| 2 | 600 × 250 × 100 Example 2 | Deformed Bar | Exposed to weather | 10-42 | 90-180 | Observed slightly rust but no additional rust occurred during 3 months to 6 months tests |
| 3 | 600 × 250 × 100 Example 3 | Deformed Bar | Exposed to weather | 10-42 | 90-180 | Observed slightly rust but no additional rust occurred during 3 months to 6 months tests |

No additional corrosion occurred on the Embedded Reinforcement bar in SMMOC matrix for 180 Days exposure to weather.

The SMMOC is non-combustible and has a high fire rating level for structural integrity and insulation in wall systems, as illustrated below in tables 11, 12, 13 and 14. The performance tests of MOC cements were carried out in accordance with AS2908 for performance of the refractory building materials in all aspects, and the test results comply with AS1530.

TABLE 21

Non-combustibility (AS1530.1 - 1994) of SMMOC

| Items | Results |
|---|---|
| Mean furnace thermocouple temperature rise | 5.2° C. |
| Mean specimen centre thermocouple temperature rise | 185.8° C. |
| Mean Specimen surface thermocouple temperature rise | 8.8° C. |
| Mean duration of sustained flaming | 0 seconds |
| Mean Mass Loss | 41.27% |

TABLE 12

Ignitability (AS1530.3 - 1994) of SMMOC.

| Parameter | Mean | Standard Error |
|---|---|---|
| Ignition Time (min) | N/A | N/A |
| Flame Spread Time (s) | N/A | N/A |
| Heat Release Integral (kJ/m$^2$) | N/A | N/A |
| Smoke Release ($\log_{10}$D) | −2.067 | 0.107 |

TABLE 13

Flammability (AS1530.2 - 1994) of SMMOC.

| Ignitability Index (0-20) | Spread of Flame Index (0-10) | Heat Evolved Index (0-10) | Smoke Developed Index (0-10) |
|---|---|---|---|
| 0 | 0 | 0 | 0 |

TABLE 14

Fire Rating Level for SMMOC PANEL External Wall Systems.

| PRODUCTS | PURPOSES | THICKNESS (mm) | FRL |
|---|---|---|---|
| SMMOC_WEATHERBOARD | External Wall Cladding | 16 | 60/60/60 |
| SMMOC_INSTACLAD | External Wall Cladding | 9-19 | 30/30/30 |
| | | | 60/60/60 |
| | | | 90/90/90 |
| | | | —/120/120 |

TABLE 14-continued

Fire Rating Level for SMMOC PANEL External Wall Systems.

| PRODUCTS | PURPOSES | THICKNESS (mm) | FRL |
|---|---|---|---|
| SMMOC_EXPRESS | External Wall Cladding | 16 | 30/30/30 |
| | | | 60/60/60 |
| | | | 90/90/90 |
| | | | —/120/120 |
| SMMOC_DECKRACE | External Decking | 16 | BAL/FZ |

Figure 8:
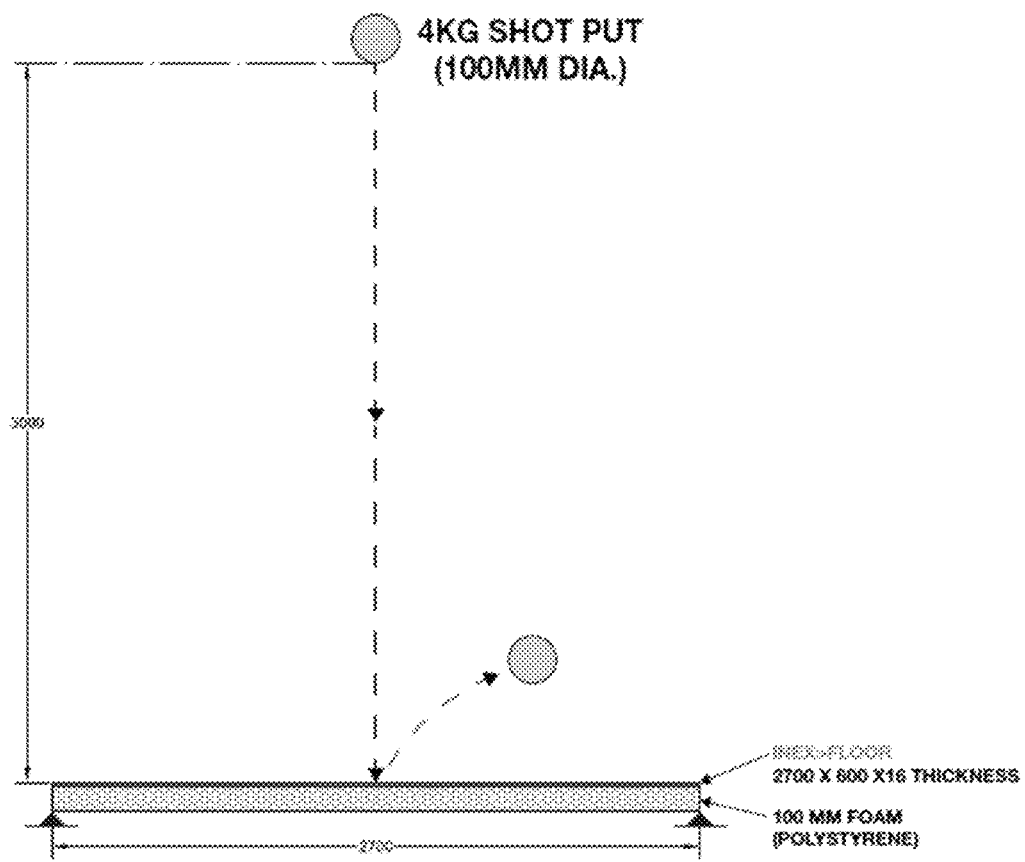
FIG. 8 shows an impact shot put test on SMMOC PANEL.
Figure 9:
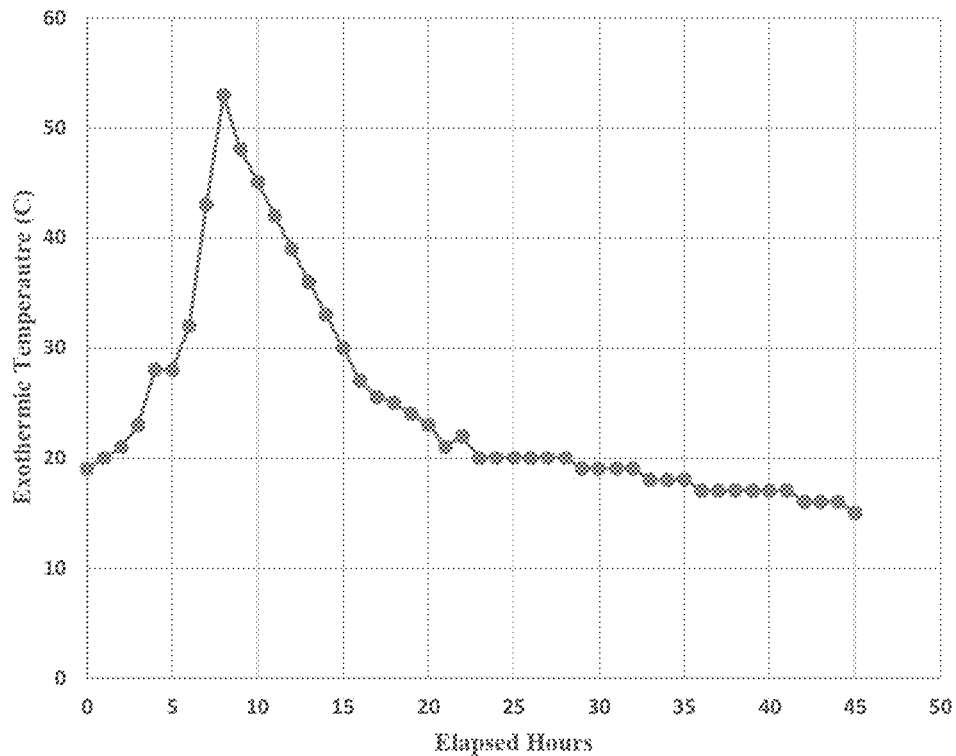
FIG. 9 shows exothermic temperatures in the 16 mm SMMOC material during the hydration process.

FIG. 8 shows an illustration of a falling ball impact test carried out on the SMMOC according to the invention. A 4 kg steel ball is dropped on to a 16 mm thick panel of the SMMOC, resting on a 100 mm polystyrene sheet, from a height of 3000 mm. The results of the test are given in table 15.

TABLE 15

Falling Ball Impact

| Item | Specification |
|---|---|
| SMMOC test specimen dimensions | 600 mm × 2700 mm × 16 mm |
| Steel Ball weight | 4 kg |
| diameter | 100 mm |
| Result | No breakage |
| | No crater |
| | Impact mark < 20 mm |

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. A magnesium oxychloride cement (MOC) integrating an emulsion of active cationic organo-silane; light burnt magnesia; magnesium chloride hexahydrate; cementitious industrial by-products; and water, wherein the cementitious industrial by products is one or more materials selected from the group consisting of: fly ash, silica fume, ground granulated blast-furnace slag, wherein a weight ratio of light burnt magnesia and magnesium chloride hexahydrate is in the range 1.5 to 2.2, wherein the light burnt magnesia has a specific surface area of 120 m²/kg to 150 m²/kg, wherein the light burnt magnesia makes up 40% to 50% by mass of the MOC on a dry solids basis, wherein a mass ($M_{Si}$) of the emulsion of active cationic organo-silane in the MOC complies with the following equation:

$$M_{Si} = \frac{1}{\omega} \times \frac{(M_{mo} + M_{mcl}) + 2(M_{solid})}{1000},$$

wherein $M_{mo}$ is the mass of MgO, $M_{mcl}$ is the mass of $MgCl_2$ crystals, and $M_{solid}$ is the mass of the MOC excluding MgO, $MgCl_2$ and water, and $\omega$ is a solid concentration of silane in the emulsion of active cationic organo-silane in term of percentages, and wherein water is present in an amount of 0.40 to 0.50 times of the amount of total weight of MOC.

2. The MOC of claim 1, wherein molar ratio of MgO/$MgCl_2$ is in the range 8.0 to 11.0.

3. The MOC of claim 1, wherein the light burnt magnesia has a purity of MgO of 80% to 98%, an activity of 60% to 68%.

4. The MOC of claim 1, wherein the magnesium chloride hexahydrate is in a crystal form, has a purity of 97%-99% and makes up between 18% to 25% by weight of the MOC on a dry solids basis.

5. The MOC of claim 1, further comprising expanded perlite.

6. The MOC according to claim 5, wherein the expanded perlite has a water absorption capacity of 47% by volume.

7. The MOC according to claim 5, wherein the expanded perlite has a particle size of 1 mm to 3 mm.

8. The MOC composition according to claim 1, further including exfoliated vermiculite with a particle size of less than 1 mm.

9. The MOC composition according to claim 1, further including an organic fibre.

10. The MOC according to claim 9, wherein the organic fibre is rice husk.

11. The MOC composition according to claim 1, further including an inorganic fibre.

12. The MOC according to claim 11, wherein the inorganic fibre is alkali-coated C-glass fibre.

13. The MOC according to claim 12, wherein the alkali-coated C-glass fibre has a length of 6 to 8 mm.

14. The MOC according to claim 11, wherein the organic fibre is structural PVA fibre.

15. The MOC according to claim 14, wherein the structural PVA fibre has length of 8 to 12mm with 8 denier of filament diameter, and Tensile strength of 1600 MPa.

16. The MOC of claim 1, wherein the calculation of the mass ($M_{Si}$) of the emulsion of active cationic organo-silane in the MOC is based on the surface area of the materials.

17. A method for producing the MOC composition according to claim 1, said method comprising the steps of:
preparing a brine by dissolving magnesium chloride crystals in water;
adding an emulsion of active cationic organo-silane to the brine;
mixing said brine with light burnt magnesia to form a paste; and
adding the cementitious industrial by products.

18. The method according to claim 17, wherein the brine is activated by adding phosphoric acid thereinto before adding the emulsion of active cationic organo-silane to the brine.

19. The method according to claim 17, wherein the emulsion of active cationic organo-silane includes 40% to 50% of active ingredient having a particle size less than 20 nm.

20. The method of claim 17, wherein the cementitious industrial by-product is added before the addition of the light burned magnesia.

21. A building product incorporating the MOC of claim 1.

* * * * *